US009664301B2

(12) United States Patent
Grose

(10) Patent No.: US 9,664,301 B2
(45) Date of Patent: May 30, 2017

(54) VALVE BOX SYSTEM

(71) Applicant: Todd Grose, Erie, CO (US)

(72) Inventor: Todd Grose, Erie, CO (US)

(*) Notice: Subject to any disclaimer, the term of this patent is extended or adjusted under 35 U.S.C. 154(b) by 51 days.

(21) Appl. No.: 14/216,505

(22) Filed: Mar. 17, 2014

(65) Prior Publication Data

US 2014/0261759 A1 Sep. 18, 2014

Related U.S. Application Data

(60) Provisional application No. 61/793,935, filed on Mar. 15, 2013.

(51) Int. Cl.
*F16K 31/46* (2006.01)
*E03B 7/09* (2006.01)

(52) U.S. Cl.
CPC ............ *F16K 31/46* (2013.01); *E03B 7/095* (2013.01); *Y10T 137/598* (2015.04); *Y10T 137/6991* (2015.04); *Y10T 137/7014* (2015.04); *Y10T 137/7017* (2015.04); *Y10T 137/7021* (2015.04); *Y10T 137/7043* (2015.04); *Y10T 403/556* (2015.01)

(58) Field of Classification Search
CPC ...... F16K 27/00; Y10T 403/55; Y10T 403/56; Y10T 403/556; Y10T 137/6991–137/7021; Y10T 137/7043
USPC .................. 137/363–371, 315.01; 138/96 T; 285/136.1; 220/4.03
See application file for complete search history.

(56) References Cited

U.S. PATENT DOCUMENTS

| | | | | |
|---|---|---|---|---|
| 215,883 A | * | 5/1879 | Connolly | F16K 27/006 137/368 |
| 225,385 A | * | 3/1880 | Hummer | E03B 7/04 137/365 |
| 307,753 A | * | 11/1884 | Earle | F16K 31/46 137/369 |
| 380,196 A | * | 3/1888 | Ette | F16K 31/46 137/369 |
| 414,546 A | * | 11/1889 | Kallaher | F16K 31/46 137/369 |
| 420,044 A | * | 1/1890 | Dennis | E03B 9/08 137/370 |
| 604,622 A | * | 5/1898 | Lobdell | E03B 7/04 137/365 |
| 957,487 A | * | 5/1910 | Berry | B01D 35/04 137/363 |
| 997,412 A | * | 7/1911 | Paradine | E03B 9/08 137/369 |
| 1,108,031 A | * | 8/1914 | Tyler | F16K 27/006 137/368 |

(Continued)

OTHER PUBLICATIONS

Bingham & Taylor, Plastic & Combination Products, Catalog #13, p. 9.*

(Continued)

*Primary Examiner* — Kevin Murphy
(74) *Attorney, Agent, or Firm* — Sheridan Ross P.C.

(57) ABSTRACT

A valve box system is disclosed for providing operators with access to utility lines such as municipal water and gas systems. This valve box system provides alignment between its multiple sections and a four-notched upper section for a better interface with an adjustment tool. The result is an efficient system which may serve as a stand-alone product or may serve to retrofit existing valve box systems.

9 Claims, 5 Drawing Sheets

(56) References Cited

U.S. PATENT DOCUMENTS

| | | | | |
|---|---|---|---|---|
| 1,220,267 A | * | 3/1917 | Park | 137/371 |
| 1,239,704 A | * | 9/1917 | Lee | B65D 47/122 |
| | | | | 137/371 |
| 2,046,330 A | * | 7/1936 | Leoffert | E03B 9/10 |
| | | | | 137/366 |
| 2,959,149 A | * | 11/1960 | Schwenk | F16K 37/0008 |
| | | | | 116/277 |
| 3,537,471 A | * | 11/1970 | Houle | E03B 9/12 |
| | | | | 137/370 |
| 3,538,587 A | * | 11/1970 | Shurtleff | F16K 27/00 |
| | | | | 29/213.1 |
| 4,708,160 A | * | 11/1987 | Sharp | F16K 17/40 |
| | | | | 137/368 |
| 5,738,140 A | * | 4/1998 | Mann | E03B 9/10 |
| | | | | 116/277 |
| 8,844,558 B2 | * | 9/2014 | Ball | E03B 9/025 |
| | | | | 137/269 |
| 2003/0230343 A1 | * | 12/2003 | Phipps | E03B 9/08 |
| | | | | 137/364 |
| 2004/0156674 A1 | * | 8/2004 | Ko | F16B 12/36 |
| | | | | 403/292 |
| 2012/0087741 A1 | * | 4/2012 | Desmeules | E02D 5/285 |
| | | | | 405/251 |
| 2014/0216568 A1 | * | 8/2014 | Roell | F16L 55/1108 |
| | | | | 137/15.18 |
| 2014/0216571 A1 | * | 8/2014 | Roell | F16L 55/1108 |
| | | | | 137/363 |

OTHER PUBLICATIONS

"6500 Series; 6850 Series; 6855 Series; and 6860 Series Valve Boxes," Tyler Union, 2013, 8 pages.

"8550 Series and 8555 Series Valve Boxes," East Jordan Iron Works, Inc., 2012, 4 pages.

* cited by examiner

US 9,664,301 B2

VALVE BOX SYSTEM

CROSS-REFERENCE TO RELATED APPLICATIONS

The present application claims priority from U.S. Provisional Application No. 61/793,935, filed Mar. 15, 2013, the entire disclosure of which is hereby incorporated by reference.

FIELD OF THE INVENTION

The field of the invention generally relates to valve boxes, which provide access to utility systems and which are often located underground, including but not limited to municipal water or gas systems.

BACKGROUND OF THE INVENTION

Valve box systems are provided to assist an operator access underground utility networks. Valve box systems often provide access to an underground utility line such that an operator may operate a valve on a municipal water or gas system. Such access is a necessity to control an end user's access to municipal services, among other needs in maintaining and operating such services.

Present valve box systems often use multiple sections or components, which are often composed of cast iron, to provide access to a utility line, valve, etc. For example, Tyler Union manufactures two types of valve box systems, which are referred to in the industry as the 6500 series and the 6800 series valve box systems. These systems comprise two threaded sections, a top section and a bottom section. The top and bottom sections screw together and provide access to an underground utility line. As a further example, East Jordan Iron Works also manufactures a two-section valve box system, having a top section and a bottom section.

These two examples represent the current state of the art. However, these designs have inherent deficiencies and are difficult to properly install. One issue with simply screwing together two threaded sections is that thread tolerances do not ensure a vertical orientation of the valve box system. Due to erosion and settling of soils surrounding the two threaded sections, the joints between the two threaded sections may bend or become displaced, so that an operator may no longer have clear access through the threaded sections to the utility line, valve, etc. The result is that municipalities or contractors have to re-excavate valve box sites to correct the bend between threaded sections. The resulting delay in achieving access to the valve box may cause serious problems to the utility operator, including the potential for injury and other hazards.

Prior art designs also suffer from additional flaws, which in the event of an emergency situation can cause significant problems. For example, the inability to isolate water (or gas) lines in an emergency due to misaligned valve boxes has the capacity to impact a high number of municipal water (or gas) customers. By correcting even one of the valve boxes in a particular area or section, such as by replacing the valve box with a system described herein, the service providers may isolate the problem (i.e., may shut down a street verses a whole neighborhood) and rely on the improved valve box to access that system.

Further, current valve box systems have two notches on the surface section to allow adjustment of the height of the valve box system. Having only two points of contact for an adjustment tool causes slippage and difficult height adjustment of the valve box system, or possibility even injury. Furthermore, the assembly and placement of the surface of the prior art valve box system often results in damage to the notches, which can thereby eliminate any method for raising or lowering the height of the valve box after installation, such as following a regrade of the road surface surrounding the prior art valve box system.

SUMMARY OF THE INVENTION

Accordingly, one object of the present disclosure is to provide a valve box system to correct the deficiencies and other shortcomings of present valve box systems. In one embodiment of the present disclosure, the invention comprises a system where sections of a valve box assembly seat against one another, aligning the sections of the system such that there is not a bending problem.

In another embodiment of the present disclosure, the top section has four notches to provide a more secure interface with an adjustment tool, which will prevent slippage and avoid damage and resulting lack of utility. The valve box system disclosed herein may be utilized as a stand-alone product or it may be used to retrofit existing valve box systems.

One having skill in the art will appreciate that embodiments of the present disclosure may be constructed of materials known to provide, or predictably manufactured to provide the various aspects of the present disclosure. These materials may include, for example, iron, cast iron, aluminum, steel, stainless steel, steel alloy, aluminum alloy, chromium alloy, and other metals or metal alloys. These materials may also include, for example, ABS plastic, polyurethane, polyethylene resins, particularly fiber-encased resinous materials rubber, latex, synthetic rubber, synthetic materials, polymers, and natural or environmentally beneficial materials.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. Further details and other features will become apparent after review of the following Detailed Description and accompanying drawing figures. In addition, the materials provided in Appendix A are expressly made part of this disclosure and are incorporated by reference herein in their entirety.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

Figure 1:
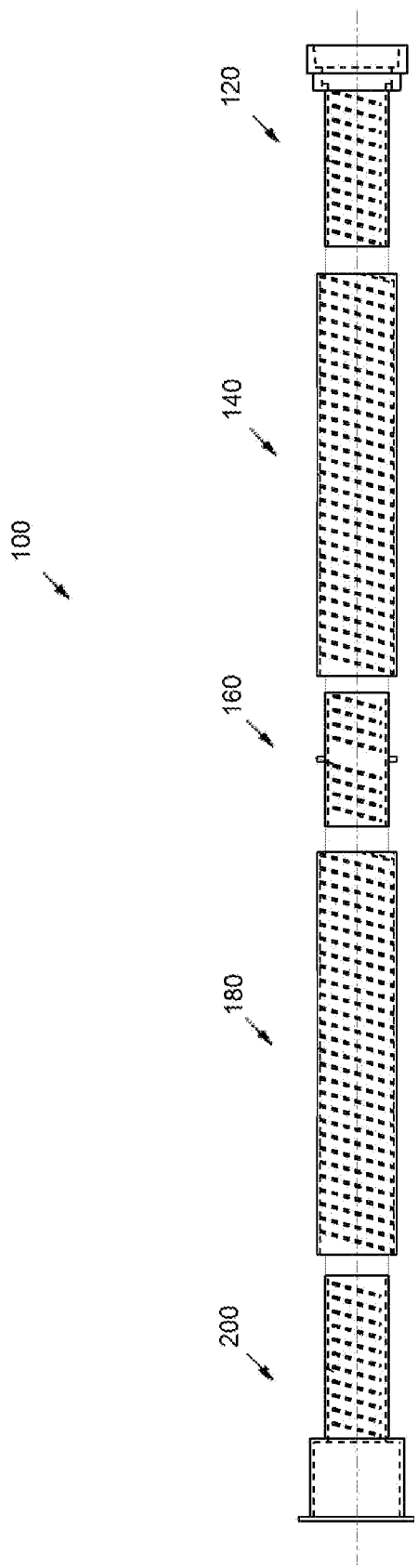
Figure 2A:
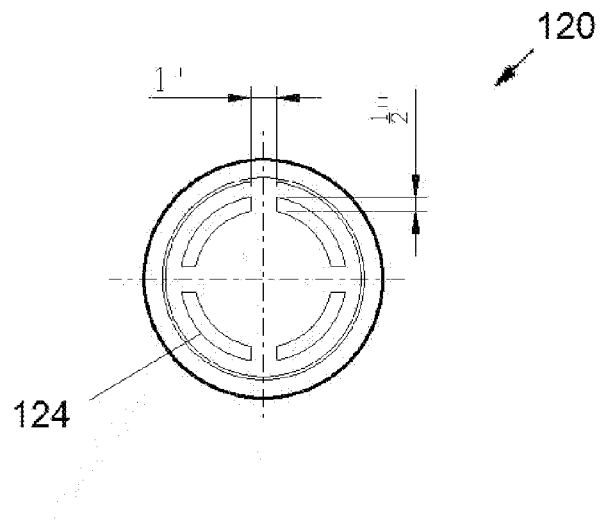
Figure 2B:
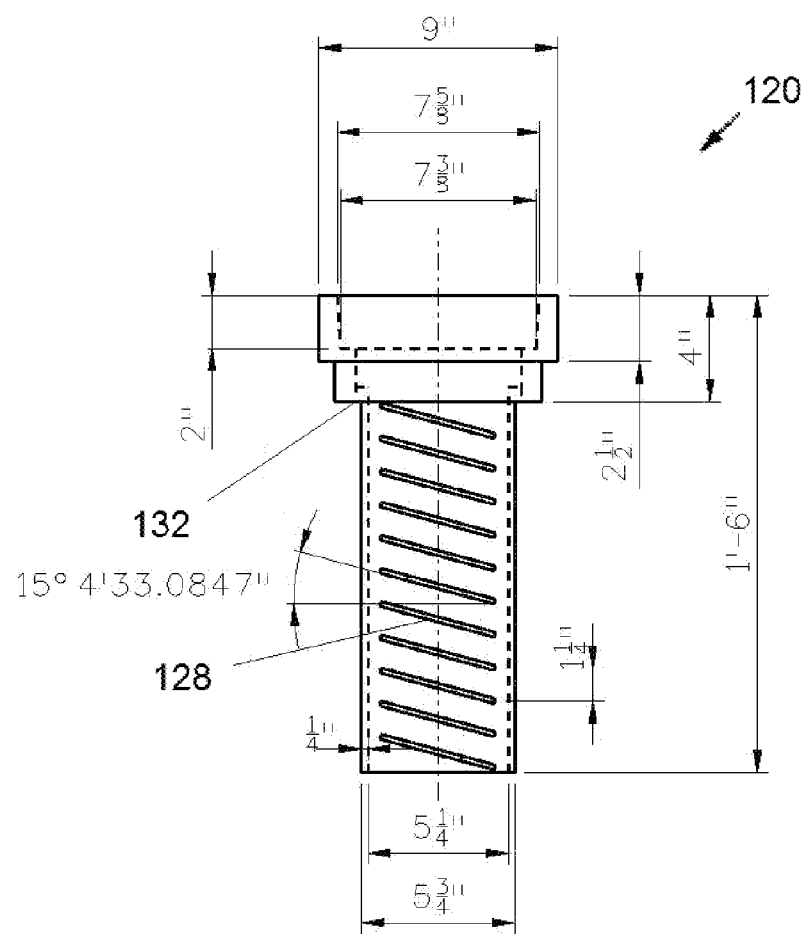
Figure 3:
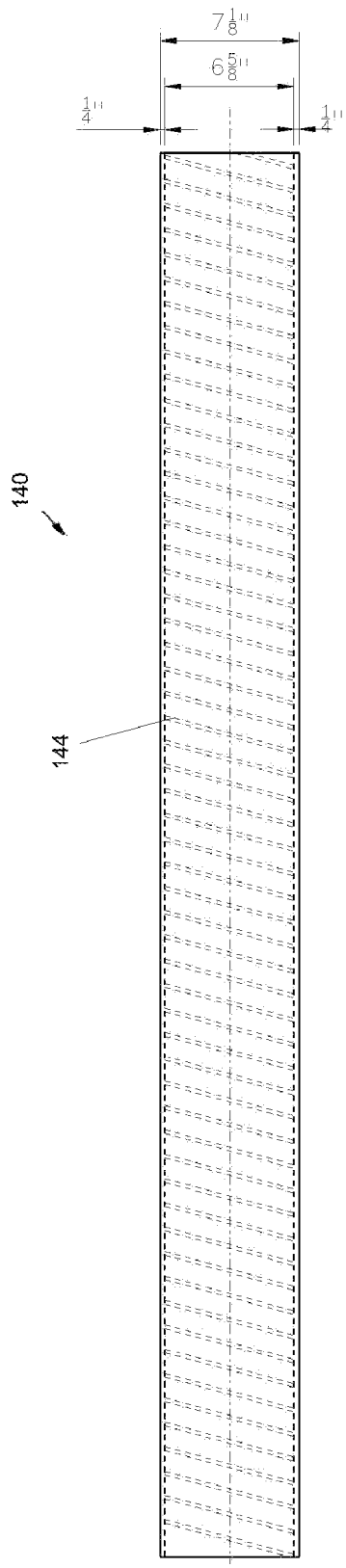
Figure 4:
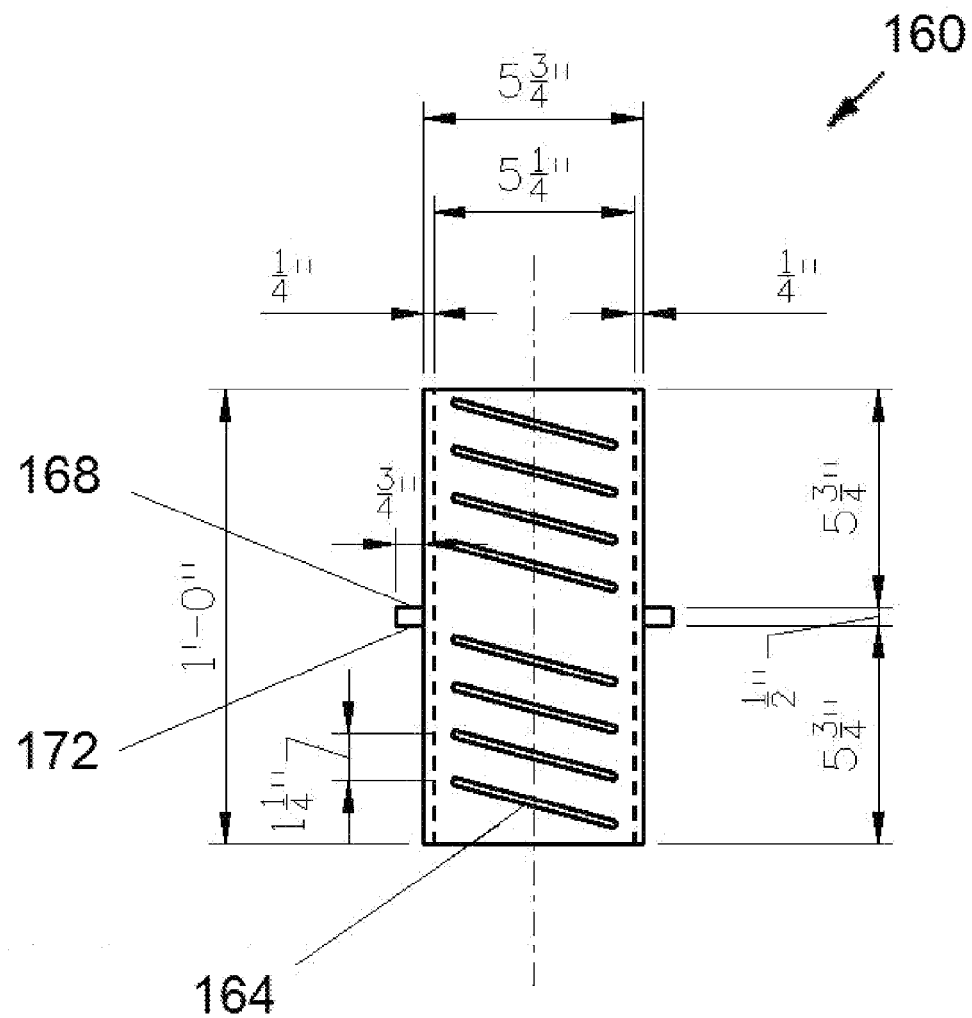

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein. In the drawings:

FIG. 1 is a side view of the valve box system with a first and second middle section;

FIG. 2A is a top view of the top section;

FIG. 2B is a side view of the top section;

FIG. 3 is a side view of the first middle section;

FIG. 4 is a side view of the connector section; and

Figure 5:
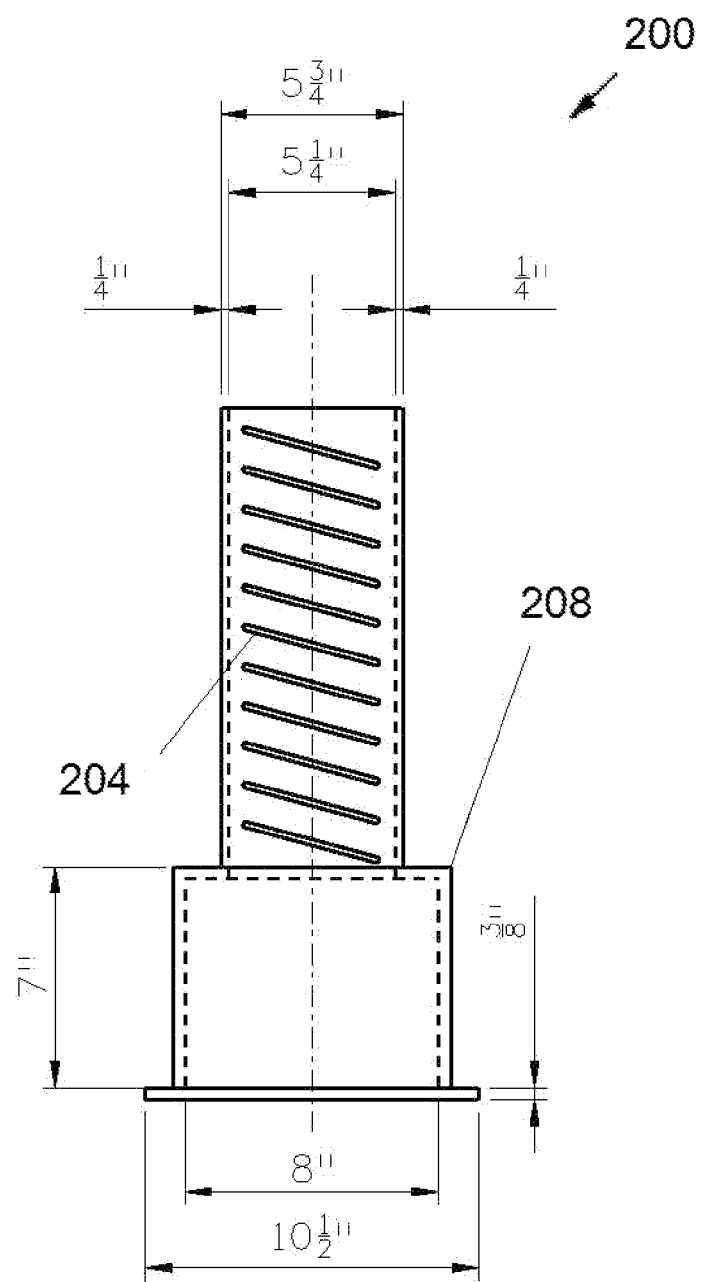

FIG. 5 is a side view of the bottom section.

DETAILED DESCRIPTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the system is provided, which illustrates the nature of the invention, and, with the annexed drawings, form a part of the specification. The exemplary method of installing the valve box system is described in detail without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning Finally, unless a claim element is defined by reciting the word "means" and a function without the recital of any structure, it is not intended that the scope of any claim element be interpreted based on the application of 35 U.S.C. §112, subparagraph (f).

FIG. 1 depicts an embodiment of the valve box system 100 that has at least a first middle section 140 and a second middle section 180. In a preferred embodiment, the first middle section 140 and the second middle section 180 are interchangeable and identical in dimension and orientation. In this particular embodiment, the top section 120 threads into the first middle section 140. The first middle section 140 threads onto a connector section 160. The connector section 160 threads into the second middle section 180. Finally, the second middle section 180 threads onto the bottom section 200. The additional second middle section 180 allows the system to reach deeper utility lines than a simpler three section embodiment of the valve box system 100. Fewer or more sections may be provided, for example, for shallower installations or where the depth of the valve box does not require multiple sections. Furthermore, sections may be cut to length to accommodate a specific depth for a new installation or to meet a new depth or grade for an installation that is affected by a repaving of the road surface, for example.

FIG. 2B depicts one embodiment of a top section 120 of the present disclosure. The top section 120 has a top section thread 128 to screw into a first middle section 140. Further, the top section 120 has a top section seat 132 which allows the top section 120 to align against the first middle section 140. The top section 120 also has a top section notch 124 which allows adjustment of the top section's 120 height relative to ground level. In one embodiment depicted in FIG. 2A, the top section 120 has four top section notches 124. In this embodiment a four-sided valve tool can securely selectively interconnect with the four top section notches 124 for easy adjustment.

FIG. 3 depicts a first middle section 140. In this embodiment the first middle section 140 has a first middle section thread 144. This first middle section thread 144 allows the first middle section 140 to screw onto a top section 120. At the other end, the first middle section thread 144 may allow the first middle section 140 to screw onto a bottom section 200 or onto a connector section 160, depending on the particular embodiment of the valve box system 100. Although the second middle section is not shown in FIG. 3, it is expressly understood that the foregoing description applies equally to the second middle section, which in a preferred embodiment is identical in dimension and orientation to the first middle section.

FIG. 4 depicts a connector section 160. The connector section 160 has a connector section thread 164 which allows the operable interconnection of a first middle section 140 and a second middle section 180. Further, the connector section 160 has a connector section first seat 168 and a connector section second seat 172. These seats provide for the alignment of the first middle section 140, the connector section 160, and the second middle section 180.

FIG. 5 depicts a bottom section 200. The bottom section 200 has a bottom section thread 204 which allows the bottom section 200 to screw into a first middle section 140 or a second middle section 180. Further, the bottom section 200 has a bottom section seat 208 which aligns the bottom section 200 with a first middle section 140 or a second middle section 180.

The valve box system 100 and its components disclosed herein may be made of a variety of different materials. These materials may include, by way of example but not limitation, iron, cast iron, aluminum, steel, stainless steel, steel alloy, aluminum alloy, chromium alloy, and other metals or metal alloys. These materials may also include, for example, ABS plastic, polyurethane, polyethylene resins, particularly fiber-encased resinous materials rubber, latex, synthetic rubber, synthetic materials, polymers, and natural or environmentally beneficial materials.

The following is a listing of components described in connection with the specification and the annexed drawing figures, and is provided to assist in describing the preferred embodiments of the present disclosure:

| Reference No. | Component |
| --- | --- |
| 100 | System |
| 120 | Top Section |
| 124 | Top Section Notch |
| 128 | Top Section Thread |
| 132 | Top Section Seat |
| 140 | First Middle Section |
| 144 | First Middle Section Thread |
| 160 | Connector Section |
| 164 | Connector Section Thread |
| 168 | Connector Section First Seat |
| 172 | Connector Section Second Seat |
| 180 | Second Middle Section |
| 200 | Bottom Section |
| 204 | Bottom Section Thread |
| 208 | Bottom Section Seat |

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g. the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A valve box system, comprising:
   a top section having a threaded outer surface and a top section flange extending outwardly above a top end of the threaded outer surface;
   a first middle section having a threaded inner surface, wherein the threaded inner surface of the first middle section is configured to receive and mate with the threaded outer surface of the top section, whereby a top end of the first middle section abuts the top section flange, to selectively interconnect and align the top section and the first middle section;
   a connector section having a top threaded outer surface, a bottom threaded outer surface, and a connector section flange extending outwardly between the top and bottom threaded outer surfaces, the connector section flange having a top face and a bottom face, wherein the threaded inner surface of the first middle section is configured to receive and mate with the top threaded outer surface of the connector section, whereby a bottom end of the first middle section abuts the top face of the connector section flange, to selectively interconnect and align the first middle section and the connector section;
   a second middle section having a threaded inner surface, wherein the threaded inner surface of the second middle section is configured to receive and mate with the bottom threaded outer surface of the connector section, whereby a top end of the second middle section abuts the bottom face of the connector section flange, to selectively interconnect and align the second middle section and the connector section;
   a bottom section having a threaded outer surface and a bottom section flange extending outwardly below a bottom end of the threaded outer surface, wherein the threaded inner surface of the second middle section is configured to receive and mate with the threaded outer surface of the bottom section, whereby a bottom end of the second middle section abuts the bottom section flange, to selectively interconnect and align the second middle section and the bottom section; and
   a valve box, selectively interconnected to the bottom section.

2. The valve box system of claim 1, wherein the sections of the valve box system are configured to be aligned substantially vertically once assembled.

3. The valve box system of claim 1, wherein the material of the valve box system is selected from the group consisting of an iron, a cast iron, an aluminum, a steel, a stainless steel, a steel alloy, an aluminum alloy, a chromium alloy, and a metal alloy material.

4. The valve box system of claim 1, wherein the material of the valve box system is selected from the group consisting of an ABS plastic, a polyurethane, a polyethylene resin, a fiber-encased resin, a rubber, a latex, a synthetic rubber, a synthetic material, and a polymer material.

5. The valve box system of claim 1, wherein the material of the valve box system comprises a natural material.

6. A valve box system, comprising:
a first riser section comprising a threaded outer surface;
a first interior section comprising a threaded inner surface;
a first coupling comprising a top threaded outer surface, a bottom threaded outer surface, and a coupling flange extending outwardly between the top and bottom threaded outer surfaces, the coupling flange having a top face and a bottom face, wherein the threaded inner surface of the first interior section is configured to receive and mate with the top threaded outer surface of the first coupling, whereby a bottom end of the first interior section abuts the top face of the coupling flange, to selectively interconnect the first interior section and the first coupling;
a base section having a threaded outer surface and a base section flange extending outwardly below a bottom end of the threaded outer surface; and
a valve box, selectively interconnected to the base section.

7. The valve box system of claim 6 further comprising a second interior section comprising a threaded inner surface, wherein the threaded inner surface of the second interior section is configured to receive and mate with the bottom threaded outer surface of the first coupling, whereby a top end of the second interior section abuts the bottom face of the coupling flange, to selectively interconnect the second interior section and the first coupling.

8. The valve box system of claim 7, wherein the selective interconnection of the first and second interior sections to the first coupling provides a substantially vertical alignment of the first and second interior sections and the first coupling.

9. The valve box assembly of claim 6 further comprising an upper surface on the first riser section comprising at least four notches to provide selective engagement by an adjustment tool having at least four prongs, wherein the selective engagement between the adjustment tool and the upper surface permits the first riser section to be raised or lowered relative to the first interior section.

* * * * *